US010279793B2

(12) United States Patent
Li et al.

(10) Patent No.: US 10,279,793 B2
(45) Date of Patent: May 7, 2019

(54) UNDERSTANDING DRIVER AWARENESS THROUGH BRAKE BEHAVIOR ANALYSIS

(71) Applicant: HONDA MOTOR CO., LTD., Minato-ku, Tokyo (JP)

(72) Inventors: Nanxiang Li, San Mateo, CA (US); Teruhisa Misu, Mountain View, CA (US); Fei Tao, Richardson, TX (US)

(73) Assignee: HONDA MOTOR CO., LTD., Tokyo (JP)

( * ) Notice: Subject to any disclaimer, the term of this patent is extended or adjusted under 35 U.S.C. 154(b) by 72 days.

(21) Appl. No.: 15/593,087

(22) Filed: May 11, 2017

(65) Prior Publication Data
US 2018/0326966 A1 Nov. 15, 2018

(51) Int. Cl.
*B60T 17/22* (2006.01)
*B60T 7/14* (2006.01)
*B60W 40/09* (2012.01)
*B60W 40/08* (2012.01)

(52) U.S. Cl.
CPC ............... *B60T 17/22* (2013.01); *B60T 7/14* (2013.01); *B60W 40/09* (2013.01); *B60T 2220/02* (2013.01); *B60W 2040/0872* (2013.01); *B60W 2420/52* (2013.01)

(58) Field of Classification Search
None
See application file for complete search history.

(56) References Cited

U.S. PATENT DOCUMENTS

| 5,888,074 A | 3/1999 | Staplin et al. |
| 7,592,920 B2 | 9/2009 | Kopf et al. |
| 7,912,796 B2 | 3/2011 | Engstrom et al. |

(Continued)

FOREIGN PATENT DOCUMENTS

| DE | 102004029825 A1 | 1/2006 |
| DE | 102010048273 A1 | 5/2011 |

(Continued)

OTHER PUBLICATIONS

Tibishirani, "Regression Shrinkage and Selection via the Lasso," p. 267 (Year: 1995).*

(Continued)

*Primary Examiner* — Lail A Kleinman
(74) *Attorney, Agent, or Firm* — Arent Fox LLP

(57) ABSTRACT

Systems and methods for analyzing a driver's brake behavior are provided. In some aspects, the system includes a memory that stores instructions for executing processes for analyzing the driver's brake behavior, and a processor configured to execute the instructions. In aspects, the processes include: receiving data from one or more multi-modal sensors, determining whether each braking event of a plurality of braking events is a hard braking event; analyzing the one or more physiological signals of the driver to determine whether each of the hard braking events is a reactive hard braking event or an intended hard braking event; applying a Lasso regression analysis and a classification framework for each of the hard braking events to identify features that indicate whether a respective hard braking event is a reactive hard braking event or an intended hard braking event; and generating a signal notifying a vehicle of the features.

17 Claims, 10 Drawing Sheets

(56) References Cited

U.S. PATENT DOCUMENTS

| | | |
|---|---|---|
| 9,050,930 B2 | 6/2015 | Walsh et al. |
| 9,296,299 B2 | 3/2016 | Ricci |
| 9,424,751 B2 | 8/2016 | Hodges et al. |
| 2004/0102901 A1 | 5/2004 | Altan et al. |
| 2014/0375810 A1 | 12/2014 | Rodriguez |
| 2016/0236691 A1 | 8/2016 | Armitage et al. |
| 2017/0032673 A1 | 2/2017 | Scofield et al. |
| 2017/0369069 A1* | 12/2017 | Yen ................... B60W 40/09 |
| 2018/0118219 A1* | 5/2018 | Hiei ................... B60W 40/09 |

FOREIGN PATENT DOCUMENTS

| | | |
|---|---|---|
| EP | 2312551 A1 | 4/2011 |
| JP | 2006199159 A | 8/2006 |
| JP | 2015110411 A | 6/2015 |
| WO | WO 2012/038738 A2 | 3/2012 |
| WO | WO 2015/195275 A2 | 12/2015 |
| WO | WO 2016/073620 A1 | 5/2016 |

OTHER PUBLICATIONS

Harbluk, J., et. al., "An on-road assessment of cognitive distraction: Impacts on drivers' visual behavior and braking performance," Accident Analysis and Prevention, 2006.

Horrey, W., et. al. "Assessing the awareness of performance decrements in distracted drives," Accident Analysis and Prevention, vol. 40, pp. 675-682, 2008.

Mccall, J., et. al., "Driver Behavior and Situation Aware Brake Assistance for Intelligent Vehicles," Proceedings of the IEEE, vol. 95, No. 2, Feb. 2007.

* cited by examiner

UNDERSTANDING DRIVER AWARENESS THROUGH BRAKE BEHAVIOR ANALYSIS

TECHNICAL FIELD

Aspects of the present disclosure relate to methods and systems for analyzing a driver's brake behavior.

BACKGROUND

Driving is a highly dynamic activity where a driver's awareness of the traffic environment may play an essential role in performance. Easy, smooth driving may depend on the driver's ability to develop situation-specific expectations. In some circumstances, however, infrequent or unexpected situations may not be taken into account. Understanding these unexpected situations may provide important insight on driver situational awareness and accident prevention. For example, braking is one of the fundamental driving maneuvers, as drivers use braking to control vehicle speed, maintain the distance to the frontal traffic participants, and stop at traffic lights, among other uses. Braking is also closely related to a driver's awareness of the surrounding traffic situations. In most instances, a driver's braking may be less (or moderately) intense indicating routine driving events. However, in other instances, a driver's braking may be more intense indicating a hard braking event, which may be the result of an intentional maneuver, e.g., decelerating to make a turn or exit from a highway, or may be the result of an unexpected situation, e.g., decelerating to avoid an expected object on the roadway.

Despite the popular dichotomy of human awareness control, driving often involves top-down and bottom-up processes, where the top-down processes are associated with prediction using learned knowledge, and the bottom-up processes relate to reaction to salient features in the environment. Furthermore, handling unexpected events conventionally involves a bottom-up process, while implementing planned actions conventionally involves a top-down process. In a naturalistic driving condition, the difference between the unexpected events and implemented planned actions may be captured using driver physiological signals. Current methodologies, however, do not correlate driver physiological signals to distinguish between different types hard braking events, and/or further analyze road features to determine what may have been the cause of the different types of hard braking events.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In some aspects, the present disclosure may be used to analyze braking events, such as hard braking because: (1) understanding a driver's hard braking due to an unexpected traffic scene may provide useful insights to prevent accidents for future advanced driver assistance systems (ADAS) development; and (2) focusing on the hard braking events may ensure the association between driver physiological signals and driver awareness. In some aspects, different stimulus, such as distractions and secondary tasks, may lead to significant changes in driver physiological signals, and by analyzing hard braking events, it may be determined whether these changes in these driver physiological signals are caused by unexpected traffic conditions. Although the present disclosure relates to analyzing hard braking events, it should be understood by those of ordinary skill in the arts that the framework described herein may be used to analyze other driving maneuvers such as, but not limited to, steering wheel control and/or other ADAS functionalities.

In some aspects, the present disclosure is directed to analyzing data from a vehicle and data from wearable devices worn by the driver to detect physiological signals, and this analysis may be used to identify unexpected situations during hard braking. Based on a naturalistic driving dataset, two types of hard braking behavior may be identified: (1) reactive hard braking; and (2) intended hard braking. Reactive hard braking may be a result of a driver reacting to unexpected situations that usually lead to deviated physiological signals due to stress. Intended hard braking may be a result of a planned maneuver that includes stable physiological signals. In some aspects, the present disclosure may be used to identify the different situations in which these two types of hard braking occur. For example, aspects of the present disclosure may be used to identify features that are representative of these two types of hard braking, including a road environment. Furthermore, aspects of the present disclosure may be used to extract features from a Lidar depth scanner to represent the road scene, and further apply a Lasso regression and a classification framework to analyze the extracted features. In some aspects, the Lasso regression model may achieve a high correlation of 0.77 between a prediction and a ground truth, and the classification framework may achieve an F-score of 0.76. In further aspects, selected Lidar features may serve as high level road scene representation that may facilitate next generation ADAS to prevent accidents in unexpected traffic scenarios.

Reactive hard braking events may be in response to, but are not limited to, the following situations:

1. Approaching an intersection while the traffic light changes from green to yellow.
2. A frontal vehicle suddenly braking or cutting into traffic.
3. Merging into busy highway from a high speed ramp.
4. Stopping for traffic light after turning into a difficult illumination condition where the driver faces direct sun light.
5. A driver failing to check both side mirrors before start vehicle at the stop sign.

Intended hard braking events, vents may be in response to, but are not limited to, the following situations:

1. Following another car.
2. Approaching an intersection with a red light.
3. Executing a sharp turn and/or a "U-turn."
4. Stopping at a stop sign on a steep downhill.
5. Entering a traffic jam in highway.

Furthermore, aspects of the present disclosure may be directed to identifying physiological signals to define driving maneuvers that are closely related to the top-down and bottom-up driver attention process. Such an approach provides an understanding of a driver's awareness during driving maneuvers and its connection to the driving environment. Furthermore, aspects of the present disclosure may be directed to analyzing a Lidar depth scanner to represent the driving environment in order to provide an accurate distance measurement between frontal road objects and the vehicle. In further aspects, the present disclosure may be directed to defining reactive and intended hard braking to study hard braking behavior.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected", is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Generally described, the present disclosure provides systems and methods for estimating saliency in a drive scene.

Figure 1:
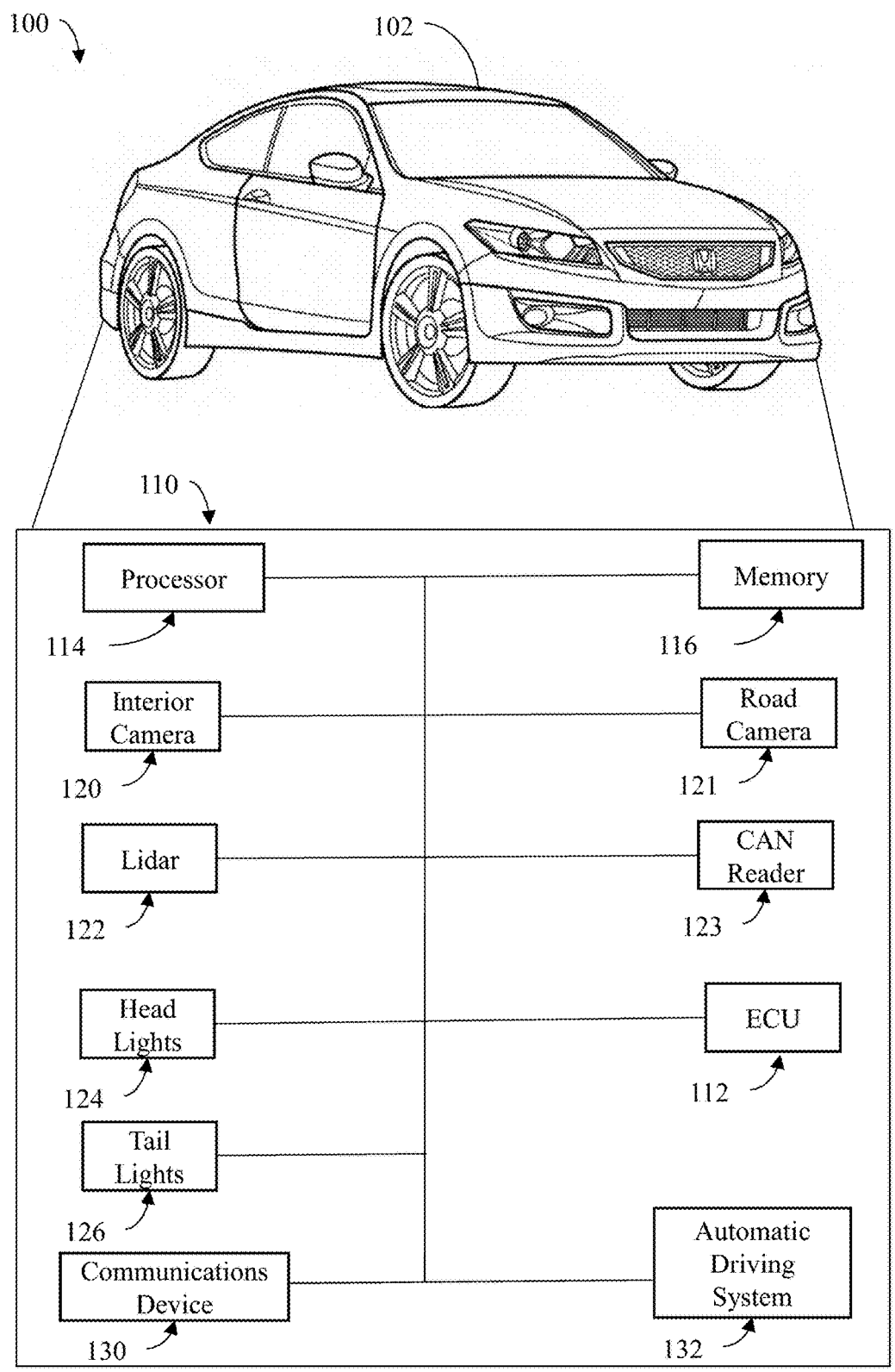
FIG. 1 illustrates a schematic view of an example operating environment of a data acquisition system in accordance with aspects of the present disclosure.

Turning to FIG. 1, a schematic view of an example operating environment 100 of a vehicle data acquisition system 110 according to an aspect of the disclosure is provided. The vehicle data acquisition system 110 may reside within a vehicle 102. The components of the vehicle data acquisition system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle data acquisition system 110, among others, including vehicle HVAC systems, vehicle audio systems, vehicle video systems, vehicle infotainment systems, vehicle telephone systems, and the like. The data acquisition system 110 may include a plurality of multi-modal sensors including, but not limited to, an interior camera 120, a road camera 121, a Lidar laser scanner 122, and a vehicle controller area network (CAN) reader 123. In further aspects, the vehicle data acquisition system 110 may also collect data from multi-modal sensors attached to a driver, such as a chestband and/or a wristband worn by the driver. In some aspects, the plurality of multi-modal sensors may be connected to the ECU 112 to provide images of the environment surrounding the vehicle 102 and/or provide data related to operation of the vehicle 102. In further aspects, the ECU 112 may also collect data from the multi-modal sensors attached to the driver.

In some aspects, the interior camera 120 may capture images and/or video of the driver, while the road camera 121 may capture images and/or video of the road. In some aspects, the interior camera 120 and the road camera 121 may be installed below a rear mirror of the vehicle. In further aspects, the interior camera 120 and the road camera 121 may capture video images of the driver and the road, respectively, at 15 frames per second (FPS).

Figure 3:
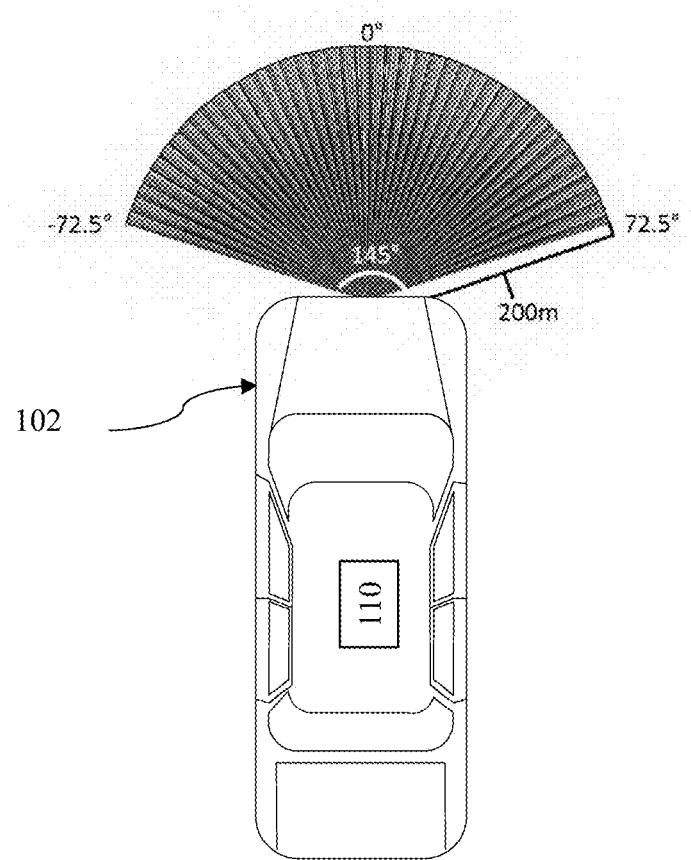
FIG. 3 illustrates an example sensor operation, according to aspects of the present disclosure.

In further aspects, the Lidar laser scanner 122 may operate as illustrated in FIG. 3. For example, the Lidar laser scanner 122 may operate at a distance of between 0 and 200 meters.

The Lidar laser scanner 122 may include a 145 degree horizontal field of view (FOV), and may be installed in a middle of a frontal bumper of the vehicle 102 to capture a distance between frontal objects and the vehicle 102.

In further aspects, the CAN reader 123 may provide vehicle information including, but not limited to, speed, braking, throttle, steering, yaw rate, and velocity, etc. In further aspects, the driver may wear the chestband to record an electrocardiogram (ECG) signal and a breath rate, and the wristband to record a galvanic skin response GSR.

In some aspects, each of the signals from the interior camera 120, road camera 121, Lidar laser scanner 122, CAN reader 123, as well as the chestband/wristband are synchronized to a same system clock. In this way, the data collected by the multi-modal sensors may include both internal and external signals capturing the interaction between the driver and the driving environment. For example, physiological signals may be used to determine a driver's mental state, e.g., stress, anxiety, comfort, etc., that is often difficult to directly estimate from driver face, gaze and gesture.

Table I summarizes some of the multi-modal signals, and their respective frequencies, collected by the interior camera 120, road camera 121, Lidar laser scanner 122, and vehicle controller area network (CAN) reader 123, respectively, in addition to the wristband sensor and/or chestband sensor worn by the driver.

TABLE I

| Sensor | Signal | Frequency |
| --- | --- | --- |
| Road Camera | Video | 15 FPS |
| Driver Camera | Video | 15 FPS |
| Lidar Scanner | Depth | 25 FPS |
| CAN | Throttle | 100 Hz |
|  | Brake | 50 Hz |
|  | Steering | 100 Hz |
|  | Yaw | 100 Hz |
|  | Velocity | 100 Hz |
| Chestband | Heart Rate | 1 Hz |
|  | Breath Rate | 1 Hz |
| Wristband | GSR | 4 Hz |

The data acquisition system 110 may also include a processor 114 and a memory 116 that communicate with the interior camera 120, road camera 121, Lidar laser scanner 122, vehicle controller area network (CAN) reader 123, wristband sensor, chestband sensor, head lights 124, tail lights 126, communications device 130, and automatic driving system 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle data acquisition system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include head lights 124 and tail lights 126, which may include any conventional lights used on vehicles. The head lights 124 and tail lights 126 may be controlled by the vehicle data acquisition system 110 and/or ECU 112 for providing various notifications. For example, the head lights 124 and/or tail lights 126 may be activated or controlled to provide desirable lighting when scanning the environment of the vehicle 102.

Figure 2:
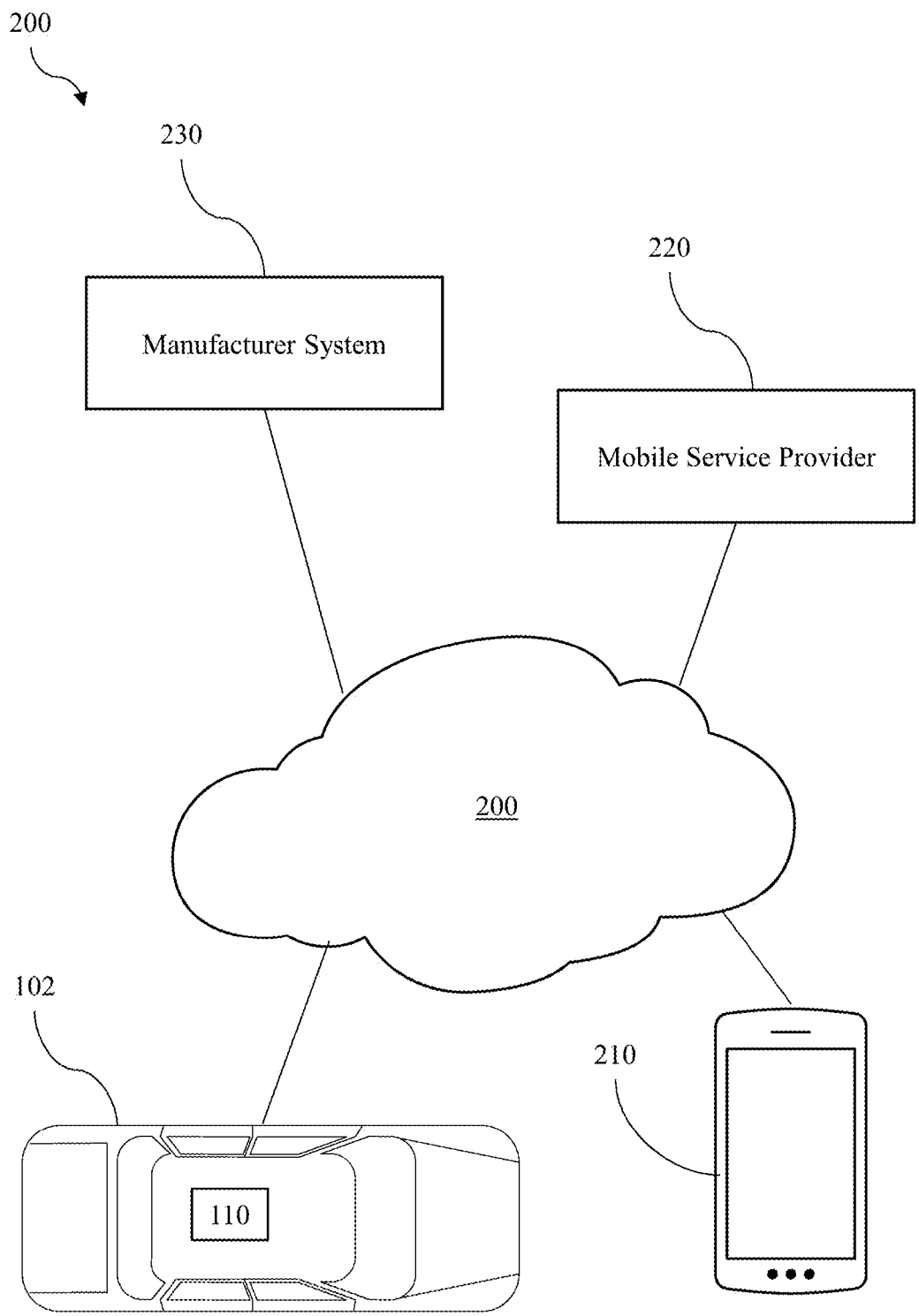
FIG. 2 illustrates an example network for managing the data acquisition system.

FIG. 2 illustrates an example network 200 for managing the data acquisition system 110. The network 200 may be a communications network that facilitates communications between multiple systems. For example, the network 200 may include the Internet or another internet protocol (IP) based network. The network 200 may enable the data acquisition system 110 to communicate with a mobile device 210, a mobile service provider 220, or a manufacturer system 230. The data acquisition system 110 within the vehicle 102 may communicate with the network 200 via the communications device 130. The data acquisition 110 may, for example, data collected by the multi-modal sensors.

Figure 9:
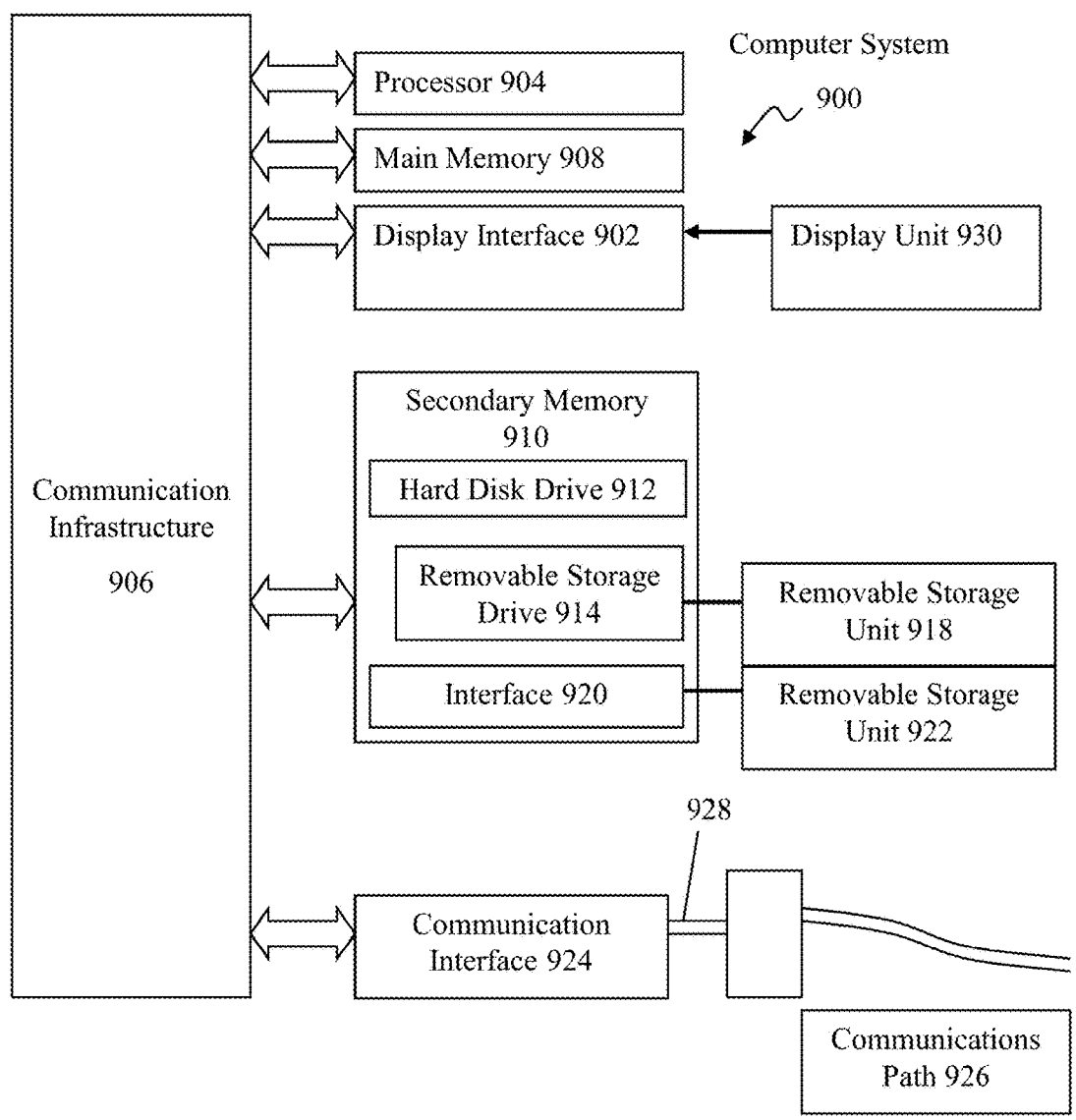
FIG. 9 illustrates various features of an example computer system for use in conjunction with aspects of the present disclosure.

The manufacturer system 230 may include a computer system, as shown with respect to FIG. 9 described below, associated with one or more vehicle manufacturers or dealers. The manufacturer system 230 may include one or more databases that store data collected by the front camera 120, roof camera 121, and/or the rear camera 122. The manufacturer system 230 may also include a memory that stores instructions for executing processes for analyzing a driver's brake behavior and a processor configured to execute the instructions.

In some aspects, a braking event may be defined as a temporal sequence, where a brake is engaged. In some aspects, an intensity of a braking event I may be defined as a maximum deceleration during braking and may be calculated based on the velocity recorded by the CAN reader 123, as shown in Equations (1) and (2):

$$I=|\min(\Delta([v_{t0}, v_{t1}, \ldots, v_{tm}]))| \quad (1),$$

where $$\Delta([x_0, x_1, \ldots, x_n])=[x_1-x_0, \ldots, x_n-x_{n-1}] \quad (2).$$

Figure 4:
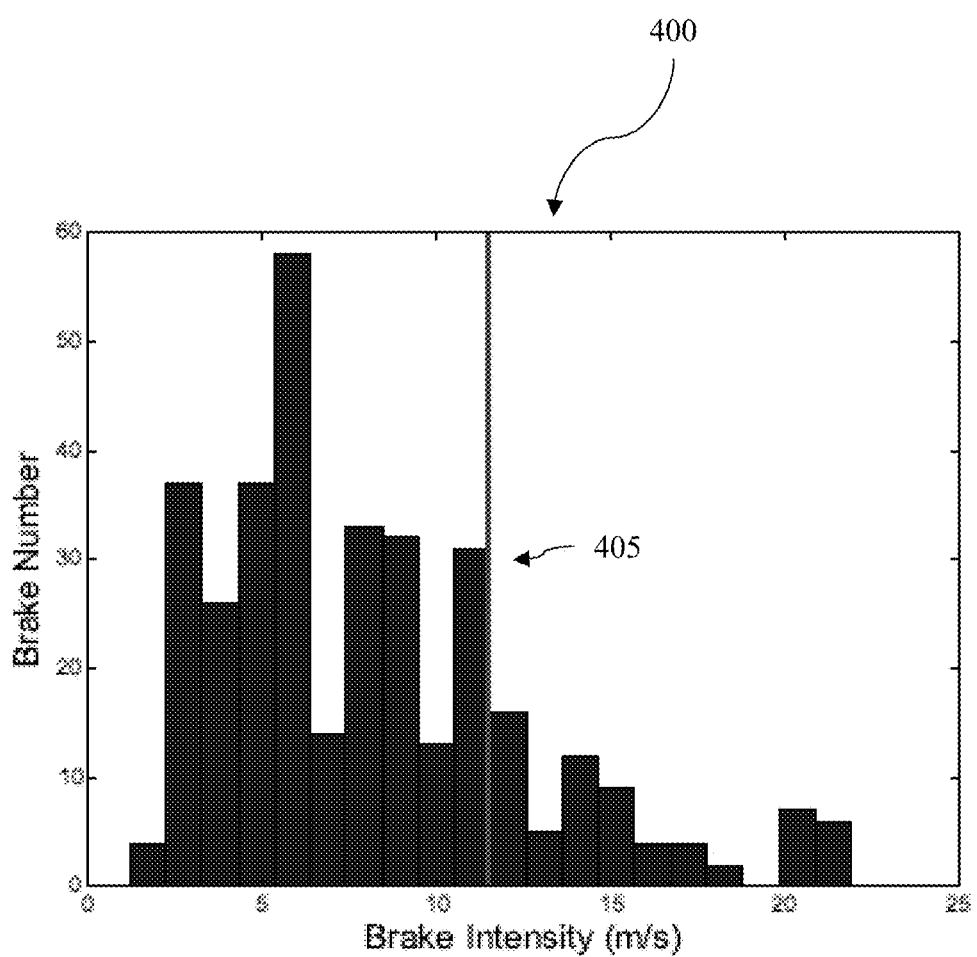
FIG. 4 illustrates an example graph demonstrating a braking intensity (m/s) and a number of braking events for each braking intensity, according to aspects of the present disclosure.

In some aspects, during routine driving, most of the braking events include low to medium brake intensity, thereby indicating smooth braking. As such, any braking event falling below a threshold intensity value may be considered low to medium brake intensity event, whereas any braking events falling above the threshold intensity value may be considered a hard braking event. For example, FIG. 4 illustrates an example graph 400 demonstrating a braking intensity (m/s) and a number of braking events for each braking intensity. As shown in FIG. 4, most braking events have a brake intensity falling below an intensity of about 12 m/s. Thus, in some aspects, a threshold intensity value 405 may be set to 12 m/s; however, it should be understood by those of ordinary skill in the art that this is merely an example threshold intensity value, and that other threshold intensity values are further contemplated according to aspects of the present disclosure. In some aspects of the present disclosure, the manufacturer system 230 may be configured to define braking events exceeding the threshold intensity value 405 as hard braking events and to further analyze these hard braking events, while braking events falling below the threshold intensity value 405 may be disregarded.

Figure 5:
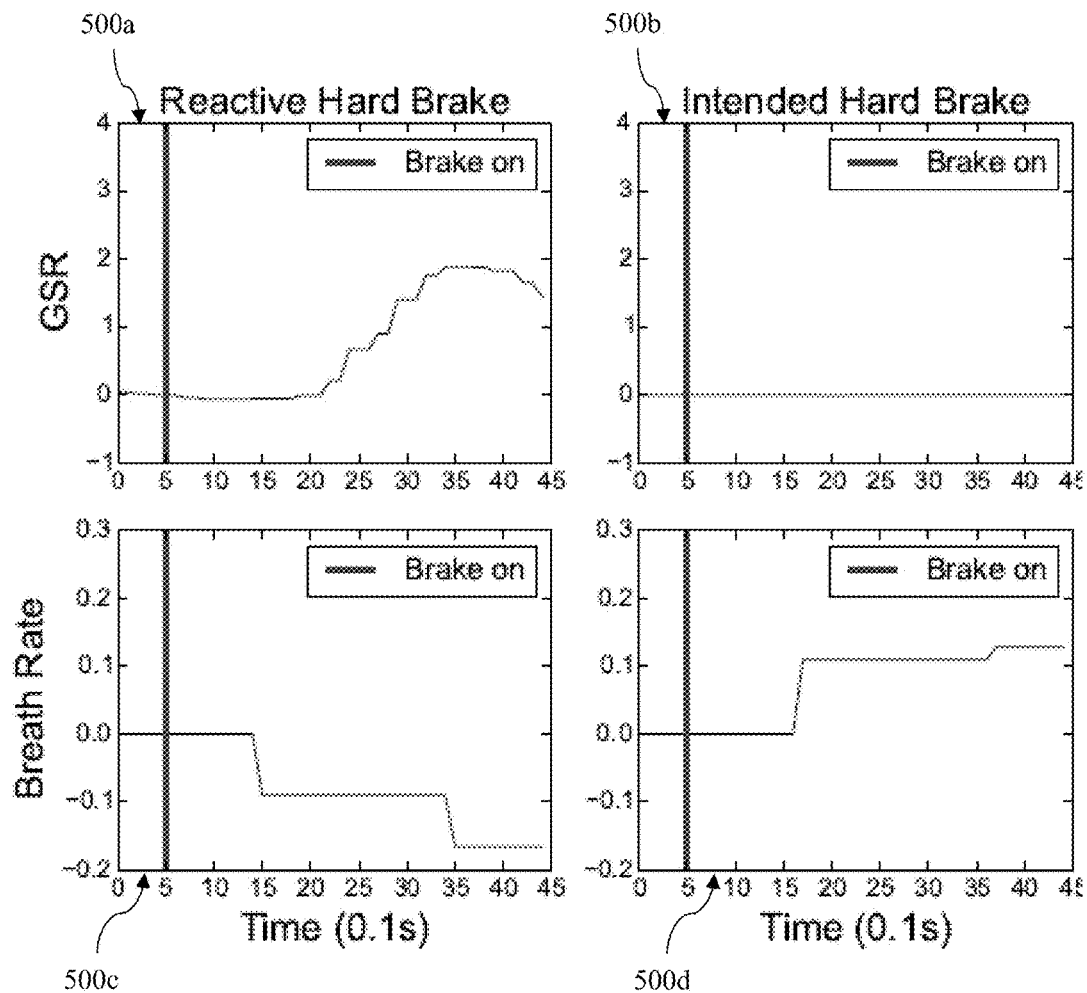
FIG. 5 illustrates a plurality of example graphs comparing the physiological signals of the driver between a reactive hard braking event and an intended hard braking event, according to aspects of the present disclosure.

The manufacturer system 230 may also extract physiological signals of a driver, such as GSR and breath rate, during a known hard braking event to determine whether it was a result of a reactive hard braking event. In turn, the manufacturer system 230 may compare the extracted physiological signals with physiological signals of a driver during an intended hard braking event. FIG. 5 illustrates a plurality of example graphs comparing the physiological signals of the driver between a reactive hard braking event and an intended hard braking event. For example, as shown in FIG. 5, graphs 500a-500d illustrate that the GSR signal increases and the breath rate decreases during the reactive hard braking event; whereas, the GSR signal remains stable and the breath rate slightly increases during the intended hard braking event.

Figure 6:
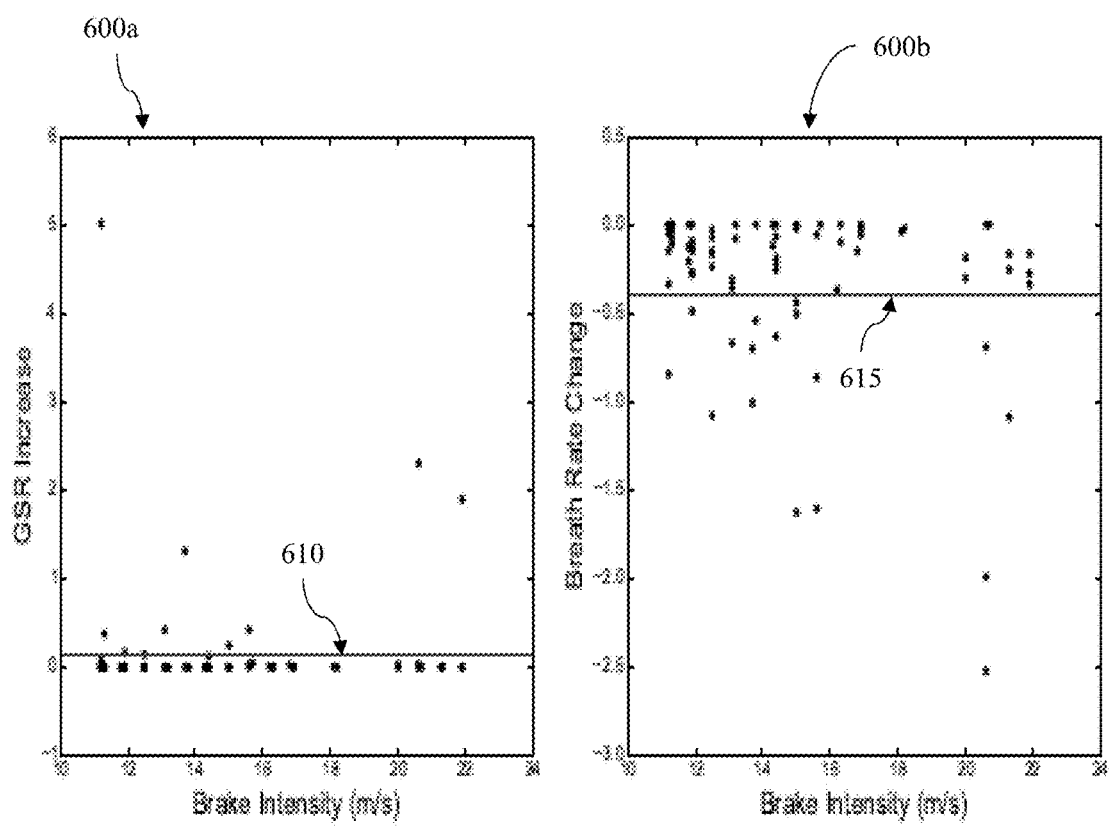
FIG. 6 illustrates a plurality of example graphs plotting the brake intensity versus physiological signals of a driver during hard braking events, according to aspects of the present disclosure.

FIG. 6 illustrates a plurality of example graphs plotting the brake intensity versus physiological signals of a driver during hard braking events, according to aspects of the present disclosure. For example, FIG. 6 illustrates graphs 600a, 600b plotting the brake intensity versus a GSR signal and a breath rate signal, respectively, during hard braking events. As shown in FIG. 6, as the brake intensity increases, the GSR signal increases and the breath rate signal decreases during some hard braking events. On the other hand, during other hard braking events, both the GSR and breath rate signals remain stable. Thus, in some aspects, a first threshold value 610 may be set for the GSR signal and a second threshold value 615 may be set for the breath rate signal. It should be understood by those of ordinary skill in the art that the physiological signals and the threshold values shown in FIG. 6 are merely example physiological signals and corresponding threshold values, and that other the physiological signals and threshold values are further contemplated according to aspects of the present disclosure.

In some aspects, the first and second threshold values 610, 615 may be used to distinguish between reactive hard braking events and intended hard braking events. For example, for GSR signals that increase beyond the first threshold value 610 during the hard braking event, the hard braking event may correspond to a reactive hard braking event; whereas for GSR signals that remain below the first threshold value 610 during the hard braking event, the hard braking event may correspond to an intended hard braking event. Similarly, for the breath rate signals, for breath rate signals that decrease beyond the second threshold value 615 during the hard braking event, the hard braking event may correspond to a reactive hard braking event; whereas for breath rate signals that remain above the second threshold value 615 during the hard braking event, the hard braking event may correspond to an intended hard braking event.

In further aspects of the present disclosure, the manufacturer system 230 may apply a Lasso regression analysis and a classification framework to explore the representation of road environment that are discriminative between reactive hard braking and intended hard braking. Through the Lasso regression analysis and the classification framework, the manufacturer system 230 may identify road features that are representative of unexpected road changes. As discussed with respect to Table 1, both road video and Lidar scanner signals may be recorded. In some aspects, the Lidar scanner signal may provide an accurate distance measurement between the a frontal object and a vehicle, e.g., the vehicle 102 of FIG. 1.

Figure 7:
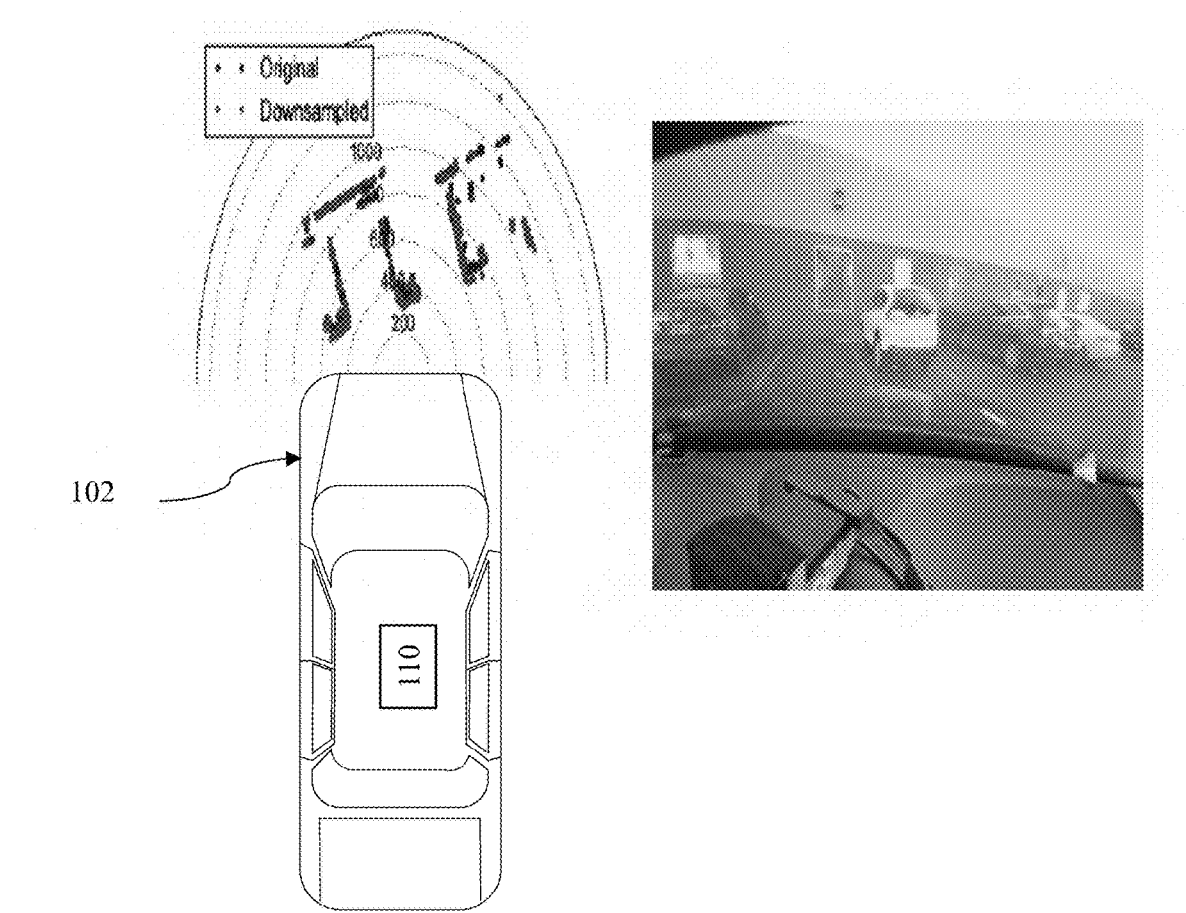
FIG. 7 illustrates a comparison of a down-sampled Lidar scanner signal and an original Lidar scanner signal, as well as a corresponding road image, according to aspects of the present disclosure.

In some aspects, the Lidar scanner signals may include over 1000 depth measurements per scan covering 145 degree horizontal field of view and 3.2 degree vertical view. In some aspects, the Lidar scanner signals may be down-sampled to a fixed-length. For example, the Lidar scanner signals may be down-sampled to a fixed-length, e.g., 291 signals, covering a 145 degree horizontal field of view with a 0.5 degree resolution. In further aspects, as shown in FIG. 3, a center frontal direction may be set as the 0 degree, a direction to the left of the vehicle may be set as a negative degree direction, e.g., −72.5 to 0 degrees, and a directions to the right of the vehicle as may be set as a positive degree direction, e.g., 0 to 72.5 degrees. FIG. 7 illustrates a comparison of the down-sampled Lidar scanner signal and the original Lidar scanner signal, as well as a corresponding road image.

In further aspects of the present disclosure, the manufacturer system 230 may estimate four statistics over a one second window before the start of each of the hard braking events for each of the 291 down-sampled Lidar signals to generate 1164 dimensional vectors, i.e., road features, that may be used as independent variables for the Lasso regression and classification framework analysis. In some aspects, the statistics may include a mean, a standard deviation, a maximum, and a minimum. In further aspects, when building linear regression models, hard braking events may be labeled as dependent variable, where a value of one may represent a reactive hard braking event and a value of zero may represent an intended hard braking event.

In further aspects of the present disclosure, a least absolute shrinkage and selection operator regression, e.g., Lasso regression, may be applied to analyze features that are correlated with the reactive hard braking events and the intended hard braking events. A person of ordinary skill in the arts would understand that Lasso is a regularized linear regression model. Given N observations $\{(x_1, y_1) \ldots (x_N, y_N)\}$, where $x_i$ may correspond to an independent variable and $y_i$ may correspond to a dependent variable, the Lasso regression may solve equation (3) for the intercept and coefficient vectors:

$$\min_{\beta_0, \bar{\beta}} \left\{ \frac{1}{2N} \sum_{i=1}^{N} (y_i - \beta_0 - x_i^T \bar{\beta}) + \lambda \sum_{j=1}^{n} |\beta_j| \right\}, \quad (3)$$

where $|\beta_j|$ may be the $L^1$ norm. The term $\lambda \Sigma_{j=1}{}^n |\beta_j|$ may serve as a penalty for high relevant independent variables in the model. As a result, the optimization may reduce the number of non-zero coefficients, and may select highly relevant independent variables, where $\lambda$ may control the degree of penalty. In some aspects, a higher value of $\lambda$ may increase the penalty, and lead to fewer non-zero coefficients, for example, when the independent variables are highly correlated.

Figure 8A:
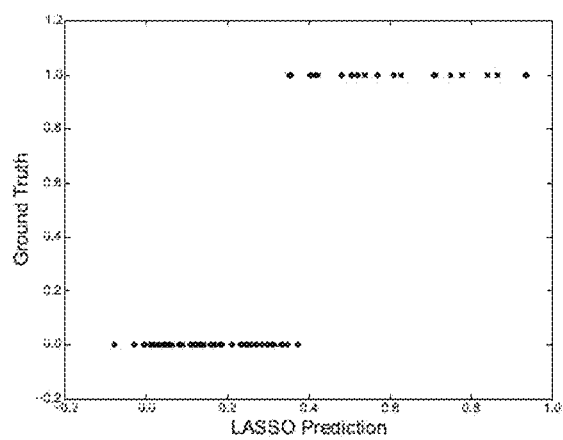
FIG. 8A shows a Lasso regression performance, according to aspects of the present disclosure

In further aspects, setting the $\lambda$ value may be determined by cross-validation. In some aspects, a 10 fold cross-validation may be used to select the $\lambda$ value. In such an example, a resulting Lasso model may achieve an R-square value of 0.603, thereby indicating a high correlation between the prediction and the ground truth value (p=0.777), as illustrated in FIG. 8A.

In further aspects of the disclosure, these results indicate that it may be possible to determine a traffic environment that may lead to unexpected braking events. For example, out of the 1164 Lidar features, 34 may be selected by the Lasso model, where features with a positive coefficient may be more related to reactive hard braking, and thus indicative of unexpected road events. In some aspects, features with a higher positive coefficient may indicate that unexpected hard braking events may happen when a frontal object is present, such as when a driver is following another vehicle. Alternatively, reactive hard braking may occur when a traffic light changes or when a driver fails to check cross traffic at a stop sign. On the other hand, the features having a higher negative coefficient may be related to objects in an adjacent lane, and as the distance to the adjacent road object decreases, the chance of an unexpected braking event increases.

In further aspects of the present disclosure, the manufacturer system 230 may analyze the Lidar features to classify hard braking events as either reactive hard braking events or intended hard braking events. For example, the manufacturer system 230 may use a binary classification using logistic regression classifier to identify Lidar features that are useful to distinguishing between reactive hard braking events and intended hard braking events. In some aspects, a chi-square feature selection may be used to reduce the Lidar features. For example, for the feature selection, chi-square statistics may be used to compare each feature variable and a target variable based on a relationship between the feature variable and the target variable. In some aspects, features with high values for the chi-squared statistic may be important features of which the target variable are dependent.

In further aspects of the present disclosure, selected features may be evaluated using a logistic regression classifier. In some instances, the data may be not balanced, as such, three metrics including precision (P), recall (R) and F-score (F) may be used to evaluate the classifiers. For example, precision may be a fraction of the classified samples with a correct label, and recall may be a fraction of the samples being classified correctly. In some aspects, the precision and recall for both classes may be calculated, and then these two metrics may be used to calculate the F-score using equation (4), which may be used as a single measurement to evaluate the performance of the classifiers for the unbalanced dataset.

$$F = \frac{2PR}{P+R} \quad (4)$$

Figure 8B:
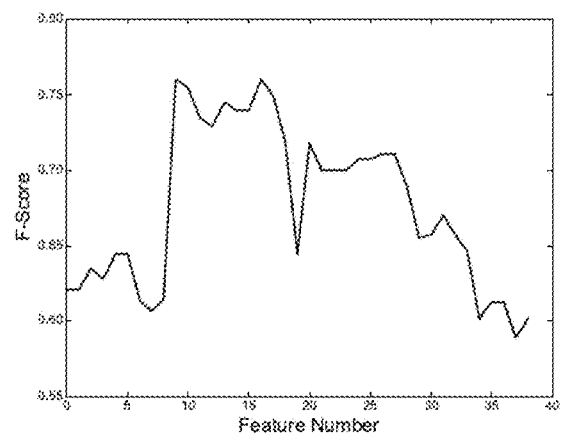
FIG. 8B shows a classification performance, according to aspects of the present disclosure.

FIG. 8B shows the classification performance using the weighted F-score as the number of feature changes. Table II shows a sample classification performance with 10 selected features.

TABLE II

|  | precision | recall | F-score |
| --- | --- | --- | --- |
| Intended Hard braking | 0.81 | 0.92 | 0.86 |
| Reactive Hard braking | 0.64 | 0.41 | 0.5 |
| Average | 0.76 | 0.78 | 0.76 |

In some aspects, an average of 0.76 F-score may be achieved with the logistic regression classifier using 10 selected features, where the 10 selected features by Chi Square feature selection include: a mean feature of the Lidar signal along directions (in degree) 1 and 1.5; a standard deviation feature along direction −34; a max feature along direction 0, 0.5, 1, 1.5, 2, 3; and a minimum feature along direction −13.5.

In some aspects, the manufacturer system 230 may generate a signal notifying the vehicle 102 of the features that indicate whether a respective hard braking event is a reactive hard braking event or an intended hard braking event. The manufacturer system 230 may notify the vehicle 102 of these features, such that the ADAS functionality of the vehicle 102 may be activated upon detection of a similar feature in the future. For example, the manufacturer system 230 may generate a signal notifying the vehicle 102 that a reactive hard braking event may have been caused by, for example, a swerving vehicle and/or a red traffic light, such that an ADAS functionality, for example, a braking system, may be activated whenever a car swerves and/or a red light is encountered. In this way, the functionality of the vehicle 102 may be controlled based on the features causing reactive hard braking events and/or intended hard braking events. Additionally, or alternatively, the manufacturing system 230 may generate a signal notifying the vehicle 102 of the features that may have caused a reactive hard braking event and/or an intended hard braking event, such that the vehicle 102 may generate a warning signal, for example, an audible or a visual warning, to alert the driver. In this way, the driver may respond to the alert to avoid potentially hazardous driving situations, e.g., avoid an accident.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 900 is shown in FIG. 9.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912, and/or a removable storage drive 914, representing a floppy disk drive, a magnetic tape drive, an optical disk drive, a universal serial bus (USB) flash drive, etc. The removable storage drive 914 reads from and/or writes to a removable storage unit 918 in a well-known manner. Removable storage unit 918 represents a floppy disk, magnetic tape, optical disk, USB flash drive etc., which is read by and written to removable storage drive 914. As will be appreciated, the removable storage unit 918 includes a computer usable storage medium having stored therein computer software and/or data.

Alternative aspects of the present invention may include secondary memory 910 and may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 918, a hard disk installed in hard disk drive 912, and signals 928. These computer program products provide software to the computer system 900. Aspects of the present invention are directed to such computer program products.

Computer programs (also referred to as computer control logic) are stored in main memory 908 and/or secondary memory 910. Computer programs may also be received via communications interface 924. Such computer programs, when executed, enable the computer system 900 to perform the features in accordance with aspects of the present invention, as discussed herein. In particular, the computer programs, when executed, enable the processor 904 to perform the features in accordance with aspects of the present invention. Accordingly, such computer programs represent controllers of the computer system 900.

In an aspect of the present invention where the invention is implemented using software, the software may be stored in a computer program product and loaded into computer system 900 using removable storage drive 914, hard drive 912, or communications interface 920. The control logic (software), when executed by the processor 904, causes the processor 904 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

Figure 10:
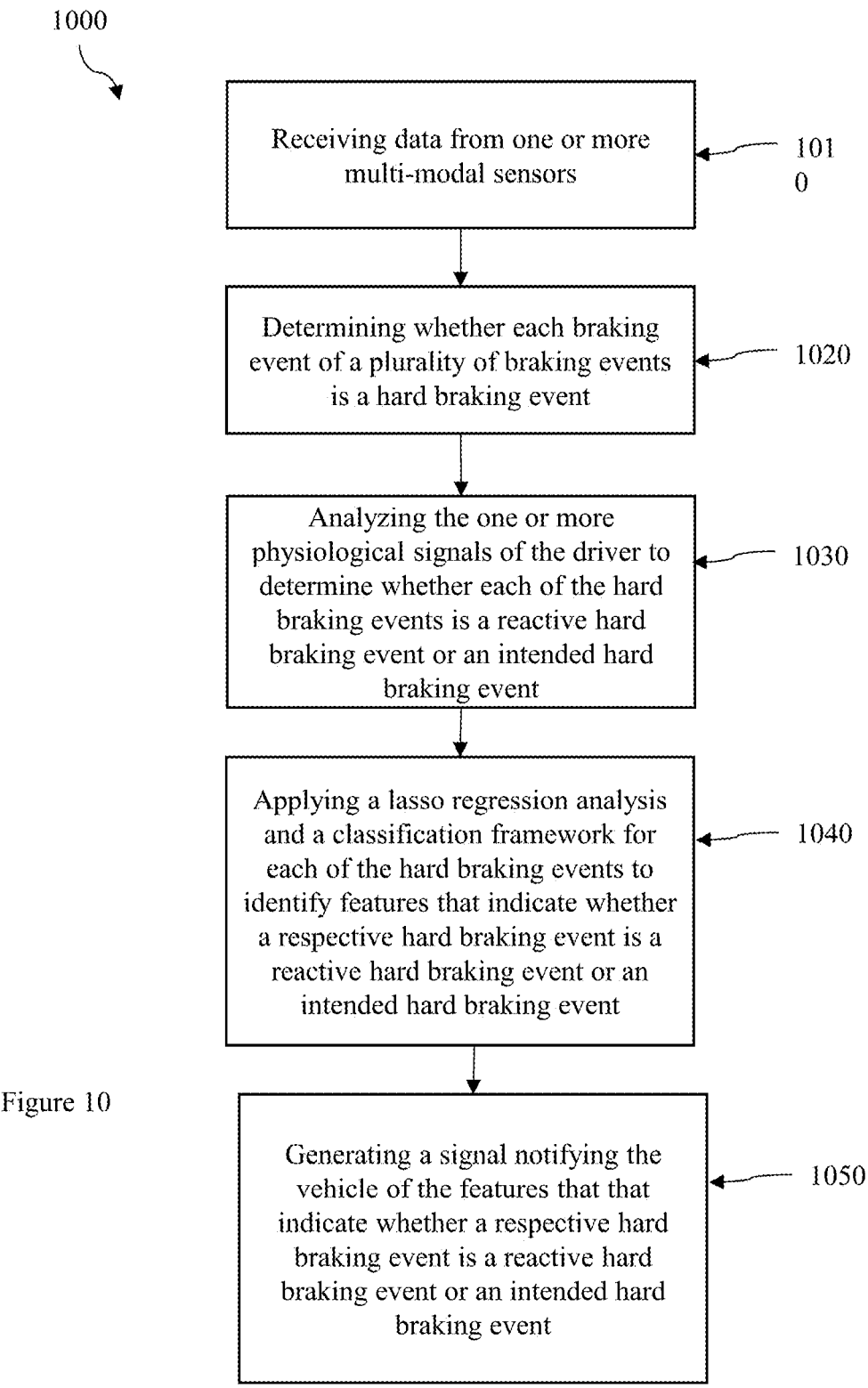
FIG. 10 illustrates a flowchart method of analyzing a driver's brake behavior, according to aspects of the present disclosure

FIG. 10 illustrates a flowchart for a method of analyzing a driver's brake behavior. The method 1000 may include receiving data from one or more multi-modal sensors 1010. The data may include one or more characteristics of a vehicle and one or more physiological signals of the driver. The method 1000 may also include determining whether each braking event of a plurality of braking events is a hard braking event 1020. The method 1000 may further include analyzing the one or more physiological signals of the driver to determine whether each of the hard braking events is a reactive hard braking event or an intended hard braking event 1030. The method may also include applying a Lasso regression analysis and a classification framework for each of the hard braking events to identify features that indicate whether a respective hard braking event is a reactive hard braking event or an intended hard braking event 1040. The method may include generating a signal notifying the vehicle of the features that that indicate whether a respective hard braking event is a reactive hard braking event or an intended hard braking event 1050.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system for analyzing a driver's brake behavior, the system comprising:
a memory that stores instructions for executing processes for analyzing the driver's brake behavior; and
a processor configured to execute the instructions, wherein the processes comprise:
receiving data from one or more multi-modal sensors, the data including one or more characteristics of a road and one or more physiological signals of the driver;
determining whether each braking event of a plurality of braking events is a hard braking event;
analyzing the one or more physiological signals of the driver to determine whether each of the hard braking events is a reactive hard braking event or an intended hard braking event, wherein the analyzing comprises determining whether a change of each of the one or more physiological signals of the driver exceeds a threshold value during the hard braking event;
applying a Lasso regression analysis and a classification framework for each of the hard braking events to identify road features that indicate whether a respective hard braking event is a reactive hard braking event or an intended hard braking event; and
generating a signal notifying a vehicle of the features that indicate whether the respective hard braking event is a reactive hard braking event or an intended hard braking event.

2. The system of claim 1, wherein, to determine whether a braking event is a hard braking event, the processor is further configured to determine whether an intensity of the braking event exceeds a threshold value, and wherein a braking event exceeding the threshold value is a hard braking event.

3. The system of claim 2, wherein the intensity of the braking event is based on a maximum deceleration during the braking event.

4. The system of claim 1, wherein:
when the one or more physiological signals exceeds the threshold value, the hard braking event is a reactive hard braking event; and
when the one or more physiological signals remains below the threshold value, the hard braking event is determined to be an intended hard braking event.

5. The system of claim 1, wherein the one or more multi-modal sensors includes a Lidar scanner, and wherein, to apply the Lasso regression analysis, the processor is further configured to:

down-sample a plurality of signals received from the Lidar scanner;

determine a plurality statistics for each of the down-sampled signals to generate a plurality of dimensional vectors; and apply the Lasso regression based on the dimensional vectors and the determination of whether each of the hard braking events is a reactive hard braking event or an intended hard braking event.

6. The system of claim 5, wherein, to apply the classification framework, the processor is further configured to apply a binary classification to identify Lidar features that distinguish between reactive hard braking events and intended hard braking events.

7. A method for analyzing a driver's brake behavior, the method comprising:

receiving data from one or more multi-modal sensors, the data including one or more characteristics of a road and one or more physiological signals of the driver;

determining whether each braking event of a plurality of braking events is a hard braking event;

analyzing the one or more physiological signals of the driver to determine whether each of the hard braking events is a reactive hard braking event or an intended hard braking event, wherein analyzing the one or more physiological signals comprises determining whether a change of each of the one or more physiological signals of the driver exceeds a threshold value during the hard braking event;

applying a Lasso regression analysis and a classification framework for each of the hard braking events to identify features that indicate whether a respective hard braking event is a reactive hard braking event or an intended hard braking event; and generating a signal notifying a vehicle of the features that that indicate whether a respective hard braking event is a reactive hard braking event or an intended hard braking event.

8. The method of claim 7, wherein determining whether a braking event is a hard braking event comprises determining whether an intensity of the braking event exceeds a threshold value, and wherein a braking event exceeding the threshold value is a hard braking event.

9. The method of claim 8, wherein the intensity of the braking event is based on a maximum deceleration during the braking event.

10. The method of claim 7, wherein:

when the one or more physiological signals exceeds the threshold value, the hard braking event is a reactive hard braking event; and when the one or more physiological signals remains below the threshold value, the hard braking event is determined to be an intended hard braking event.

11. The method of claim 7, wherein the one or more multi-modal sensors includes a Lidar scanner, and wherein, applying the Lasso regression analysis comprises:

down-sampling a plurality of signals received from the Lidar scanner;

determining a plurality statistics for each of the down-sampled signals to generate a plurality of dimensional vectors; and applying the Lasso regression based on the dimensional vectors and the determination of whether each of the hard braking events is a reactive hard braking event or an intended hard braking event.

12. The method of claim 11, wherein applying the classification framework comprises applying a binary classification to identify Lidar features that distinguish between reactive hard braking events and intended hard braking events.

13. A non-transitory computer-readable storage medium containing executable computer program code, the code comprising instructions configured to:

receive data from one or more multi-modal sensors, the data including one or more characteristics of a road and one or more physiological signals of the driver;

determine whether each braking event of a plurality of braking events is a hard braking event;

analyze the one or more physiological signals of the driver to determine whether each of the hard braking events is a reactive hard braking event or an intended hard braking event, wherein analyzing the one or more physiological signals comprises determining whether a change of each of the one or more physiological signals of the driver exceeds a threshold value during the hard braking event;

apply a Lasso regression analysis and a classification framework for each of the hard braking events to identify features that indicate whether a respective hard braking event is a reactive hard braking event or an intended hard braking event; and generate a signal notifying a vehicle of the features that that indicate whether a respective hard braking event is a reactive hard braking event or an intended hard braking event.

14. The medium of claim 13, wherein, to determine whether a braking event is a hard braking event, the code further comprises instructions configured to determine whether an intensity of the braking event exceeds a threshold value, and wherein a braking event exceeding the threshold value is a hard braking event.

15. The medium of claim 14, wherein the intensity of the braking event is based on a maximum deceleration during the braking event.

16. The medium of claim 13, wherein:

when the one or more physiological signals exceeds the threshold value, the hard braking event is a reactive hard braking event; and when the one or more physiological signals remains below the threshold value, the hard braking event is determined to be an intended hard braking event.

17. The medium of claim 13, wherein the one or more multi-modal sensors includes a Lidar scanner, and wherein:

to apply the Lasso regression analysis, the code further comprises instructions configured to:

down-sample a plurality of signals received from the Lidar scanner, determine a plurality statistics for each of the down-sampled signals to generate a plurality of dimensional vectors, and apply the Lasso regression based on the dimensional vectors and the determination of whether each of the hard braking events is a reactive hard braking event or an intended hard braking event; and to apply the classification framework, the code further comprises instructions configured to:

apply a binary classification to identify Lidar features that distinguish between reactive hard braking events and intended hard braking events.

\* \* \* \* \*